United States Patent Office 3,463,259
Patented Aug. 26, 1969

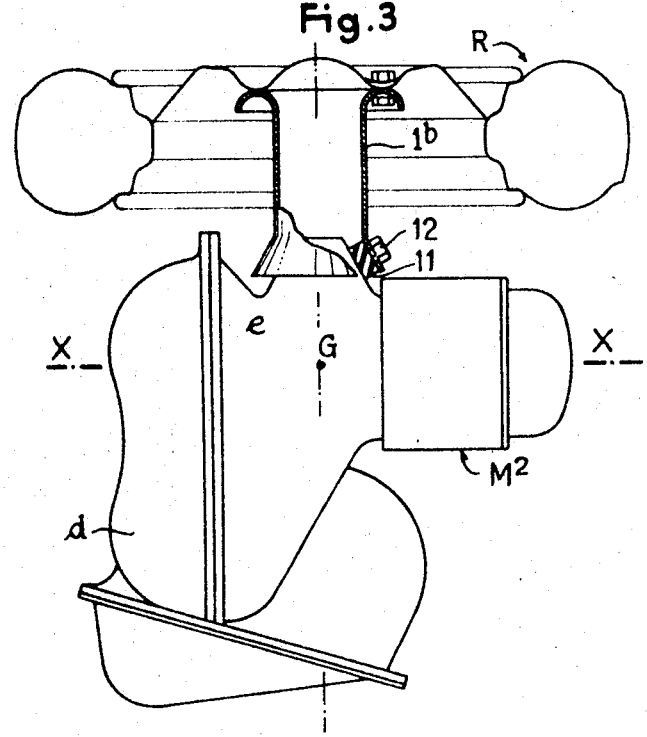
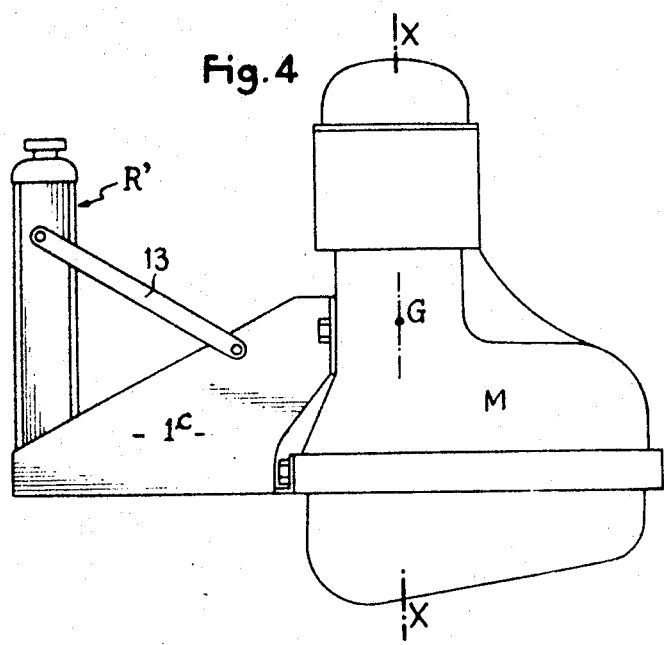

3,463,259
APPARATUS FOR BALANCING THE ENGINE OF AN AUTOMOBILE VEHICLE
Marcel Dangauthier, Paris, France, assignor to Societe Industrielle et Commerciale des Automobiles Peugeot, Paris, France, a French body corporate
Filed July 28, 1967, Ser. No. 656,800
Claims priority, application France, Aug. 31, 1966, 74,722
Int. Cl. B60k 9/00; F16m 1/02
U.S. Cl. 180—54       7 Claims

ABSTRACT OF THE DISCLOSURE

Apparatus for balancing an unbalanced engine of a motor vehicle or the like, comprising at least one support integral with engine case and on the support an accessory of the vehicle or the like, such as a spare wheel, battery or radiator, the orientation and the position of the support being such that, bearing in mind the mass of the accessory, the centre of gravity of the assembly is brought into the plane containing the axes of the cylinders of the engine.

---

Figure 1:
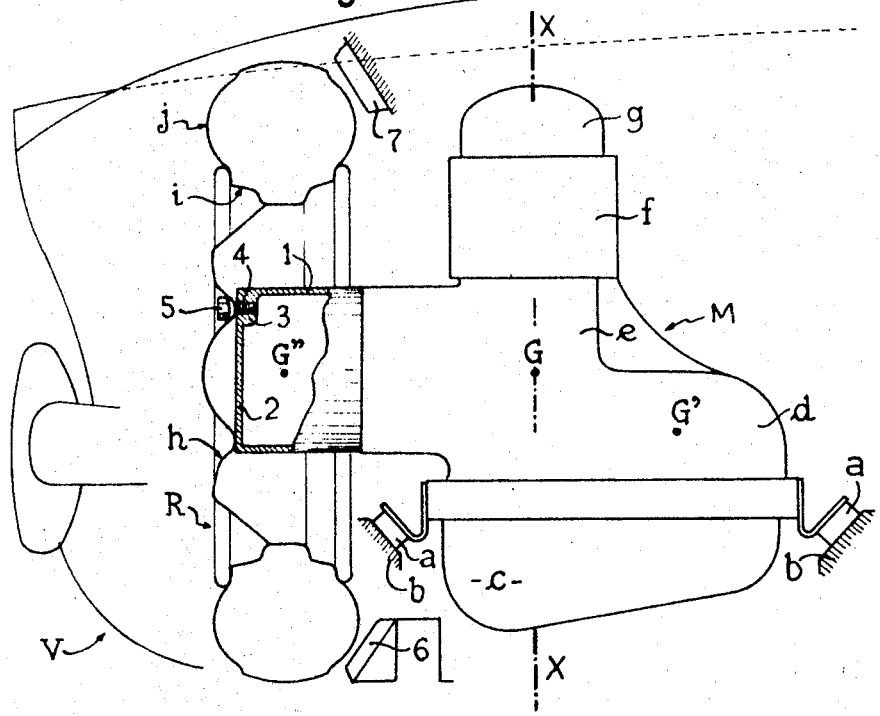

The present invention relates to internal combustion engines of the explosion type for automobile vehicles and the like.

It often occurs that such an engine comprises on one side a large mechanical unit or mass (for example a gear-box). Consequently, the centre of gravity of the assembly is not located in the plane of the cylinders and the alternating forces of inertia produce a couple about the centre of gravity which creates a rotary vibration of the drive unit which is difficult to filter in all cases, particularly when the engine is transversely disposed in the vehicle.

The object of the invention is to overcome this drawback.

The invention provides a method for balancing a normally unbalanced explosion engine of an automobile vehicle or the like, said method comprising providing on the engine at least one support integral with the case of the engine, and rigidly securing to said support at least one accessory of the vehicle or the like, the orientation and the position of the support being such that, bearing in mind the mass of said accessory, the centre of gravity of the assembly is brought into the plane containing the axes of the cylinders of the engine.

The accessory employed can be advantageously a spare wheel and/or a battery and/or a radiator, for example.

In other words, the engine is made to support the spare wheel, battery or other accessory, the fixing support for this accessory being cast in one piece with the engine case or consisting of a separate element, for example of pressed steel, which is bolted to the case.

Whatever the accessory employed, the latter is disposed very close to the mechanical part of the vehicle, so that there is a saving of space in the engine compartment. Moreover, fixing the accessory to the engine dispenses with any structural reinforcements, cross-members or cradle which would be necessary for holding the spare wheel or other accessory in space.

Further, the spare wheel or other accessory can be employed as means for limiting the movements of the engine by disposing on the body of the vehicle abutments which, for example, come in contact with the tyre of the spare wheel when shaking, due to the torque or large vibrations, occurs, and moreover it is a beater if the fixing support on the engine is given a certain elasticity, the frequency particular to this beater being, for example, adjusted in such manner as to eliminate certain vibrations of the engine.

Another object of the invention is to provide an engine unit for an automobile vehicle or other device comprising an application of the aforementioned method in that the engine, which is normally unbalanced, comprises fixed on the case of the engine at least one support on which is secured an accessory, such as a spare wheel, said support having such position and orientation and the accessory having such mass that the centre of gravity of the assembly is brought into the plane intersecting the axes of the cylinders of the engine.

Further features and advantages of the invention will be apparent from the ensuing description with reference to the accompanying drawings.

In the drawings:

FIGS. 1 to 6 are diagrammatic elevational views of improved engine units according to the invention.

In the embodiment shown in FIG. 1, the invention is applied to a transverse engine M which rests through elastically yieldable means $a$ on supports $b$ which are part of the longitudinal members of the body (not shown) of a vehicle, the contour of the front end of the latter being shown diagrammatically at V.

The internal combustion engine M of the explosion type comprises cylinders in line, the axes of which are contained in a transverse plane X—X, which can be vertical as shown, inclined or horizontal. There will be noticed on this engine, which has been represented merely diagrammatically, the oil sump $c$, adjacent to which is the gear-box $d$, the cylinder block $e$, the crank-case $f$ and the valve cover $g$.

The centre of gravity of the assembly just mentioned considered alone would not be in the plane X—X but at G′, in particular owing to the overhanging or offset mass of the gear-box, and the drawbacks mentioned hereinbefore would result.

However, according to the invention, a rigid support 1 is in one piece with the cylinder block $e$, the end face 2 of the support carrying studs 4 preferably screwed in bosses 3. The studs 4 enable the spare wheel R to be secured to this support by means of nuts 5, the wheel being secured by the disc thereof. The rim $i$ and the tyre $g$ of the wheel are also shown.

This support 1 has such position and orientation that, bearing in mind the mass of the spare wheel R, this support and wheel have a centre of gravity G″ which is such that the centre of gravity of the assembly (engine M, gear-box $d$, support 1, spare wheel R) is brought to G in the plane X—X so that there is eliminated, or at any rate considerably reduced, any vibration-producing couple which might be due to alternating forces of inertia.

The tyre can co-operate with abutments 6 and 7 which limit the couple and are rigidly secured to the body of the vehicle, the tyre coming in contact with these abutments in the event of shaking due to the couple or large vibrations.

It should be mentioned that in the event of a collision of the vehicle travelling forwardly, the shock would be transmitted at least in part through the following chain: wheel R, engine M, body, with interposition of the following deformable or elastically yieldable elements: tyre $g$, rim $i$, disc $h$ of the wheel, support 1, engine M, engine blocks $a$, longitudinal members of the body.

Further, the aforementioned chain shows that the kinetic energy stored in the mass of the engine is directly absorbed by the obstacle since the wheel R comes in contact with the latter after a very small deformation of the front of the vehicle. Any additional deformation of the structure and of the body then serves to brake and reduce the shock of the passenger compartment.

Figure 2:
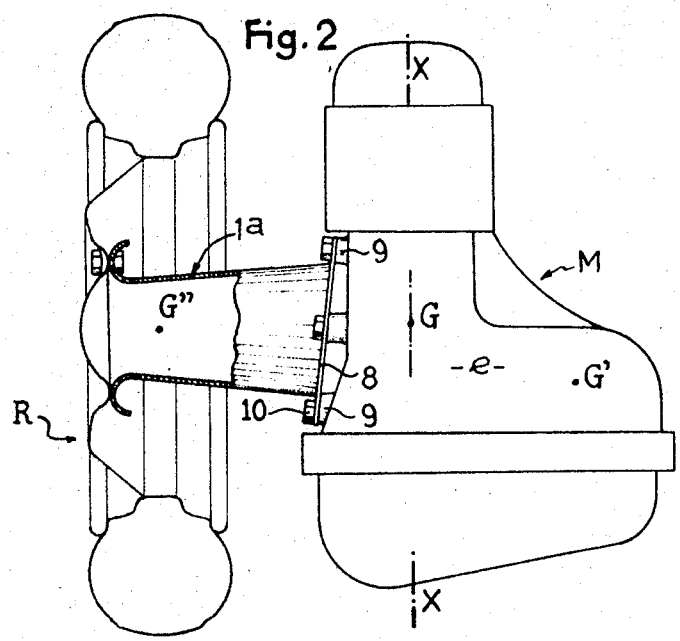

FIG. 2 shows a modification of the invention in which the support 1$a$ of the spare wheel R is rigidly secured to the engine M by means of a base-plate 8 fixed to bosses 9 on the cylinder block $e$ by means of screws 10.

It will be understood that the orientation of the engine is immaterial. In the embodiment shown in FIG. 3, the engine M extends transversely of the vehicle and the plane X—X of the axes of the cylinders is horizontal. The gearbox is shown at $d$. The centre of gravity is brought to G in the plane X—X owing to the effect of the spare wheel R which is fixed at least roughly horizontally on the rigid support 1b. The latter is fixed to the cylinder block $e$ by means of elements 11 of an elastomer material and bolts 12 which impart to the support 16b a certain elasticity and causes the wheel R to perform the additional functAion of a beater. The frequency particular to this beater can be adjusted by a suitable choice of the masses involved so as to eliminate certain vibrations of the engine.

It will be understood that any accessory other than the spare wheel can be employed for balancing the engine.

Thus, in the embodiment shown in FIG. 4, the balancing mass consists of a radiator R' which is secured to a bracket 1c which constitutes the support rigidly secured to the engine M, struts 13 steadying the radiator.

Figure 5:
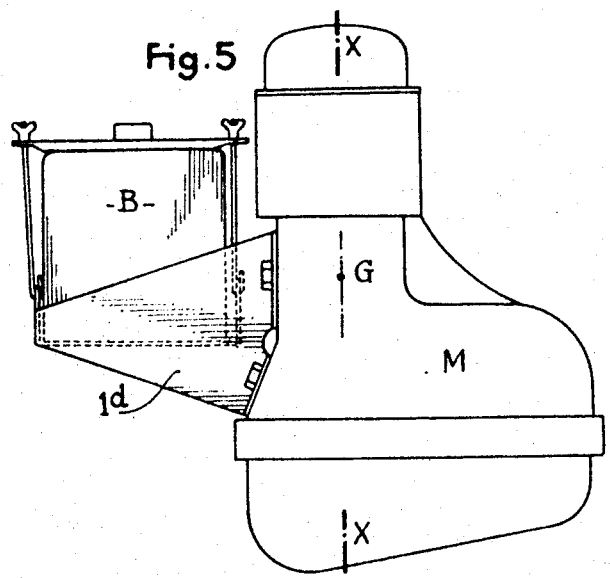
Figure 6:
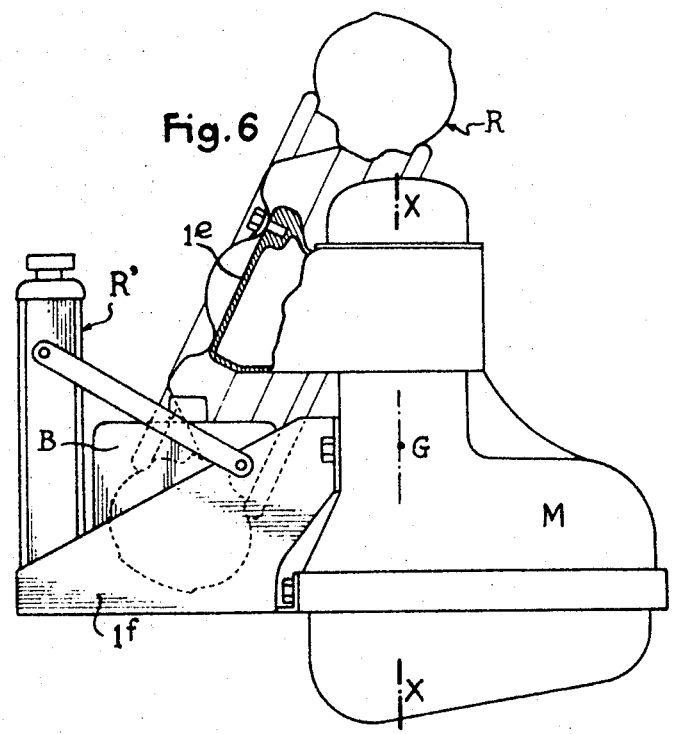

In the embodiment shown in FIG. 5, the support 1d carries the battery B.

The balancing can be achieved by means of a plurality of accessories suitably arranged. Thus, in the embodiment shown in FIG. 6, supports 1e and 1f carry respectively the spare wheel R, the radiator R' and the battery B.

Having now described my invention, what I claim as new and desire to secure by Letters Patent is:

1. An engine assembly for an automobile vehicle or the like, comprising an engine, said engine having an engine case and cylinders, the axes of which are located in a plane which is oblique with respect to the longitudinal axis of the vehicle, a gearbox and differential unit mounted on said case on one side of said plane, at least one support fixed on the case on the opposite side of said plane with respect to said gearbox and differential unit, and a relatively heavy accessory which is not usually mounted on the engine, said accessory being secured on said support, the support having such position and orientation and the accessory having such mass that they counter-balance the weight of said gearbox and differential unit so that the centre of gravity of the assembly is brought into said plane.

2. An assembly as claimed in claim 1, wherein the accessory comprises a spare wheel of the vehicle.

3. An assembly as claimed in claim 1, wherein the accessory comprises a radiator for the cooling liquid of the engine.

4. An assembly as claimed in claim 1, wherein the accessory comprises the battery of the vehicle.

5. An engine unit as claimed in claim 1, wherein the support is integral with the engine case.

6. An engine unit as claimed in claim 1, wherein the support is rigidly attached to the engine case.

7. An engine unit as claimed in claim 1, wherein elastically yieldable means are provided between the support and the engine case so that the support and the accessory constitute a beater adapted to damp vibrations of the engine.

References Cited

UNITED STATES PATENTS

| | | |
|---|---|---|
| 1,333,331 | 3/1920 | Moses. |
| 1,944,248 | 1/1934 | Lee et al. _____ 248—7 |
| 1,996,166 | 4/1935 | Meyer et al. _____ 248—7 |
| 2,641,500 | 6/1953 | Walker _____ 180—68 XR |
| 3,265,148 | 8/1966 | Foxwell _____ 180—68.5 |

FOREIGN PATENTS

| | | |
|---|---|---|
| 394,111 | 6/1933 | Great Britain. |
| 759,763 | 10/1956 | Great Britain. |

BENJAMIN HERSH, Primary Examiner

M. L. SMITH, Assistant Examiner

U.S. Cl. X.R.

248—3, 9; 180—1